2 Sheets—Sheet 1.

C. W. M. SMITH.

RAILWAY CAR.

No. 11,023. Reissued Aug. 13, 1889.

Witnesses
Walton Hurlburt
A. M. Best.

Inventor
Chester W. M. Smith
By Johnson & Hall
Attys.

2 Sheets—Sheet 2.
C. W. M. SMITH.
RAILWAY CAR.
No. 11,023. Reissued Aug. 13, 1889.
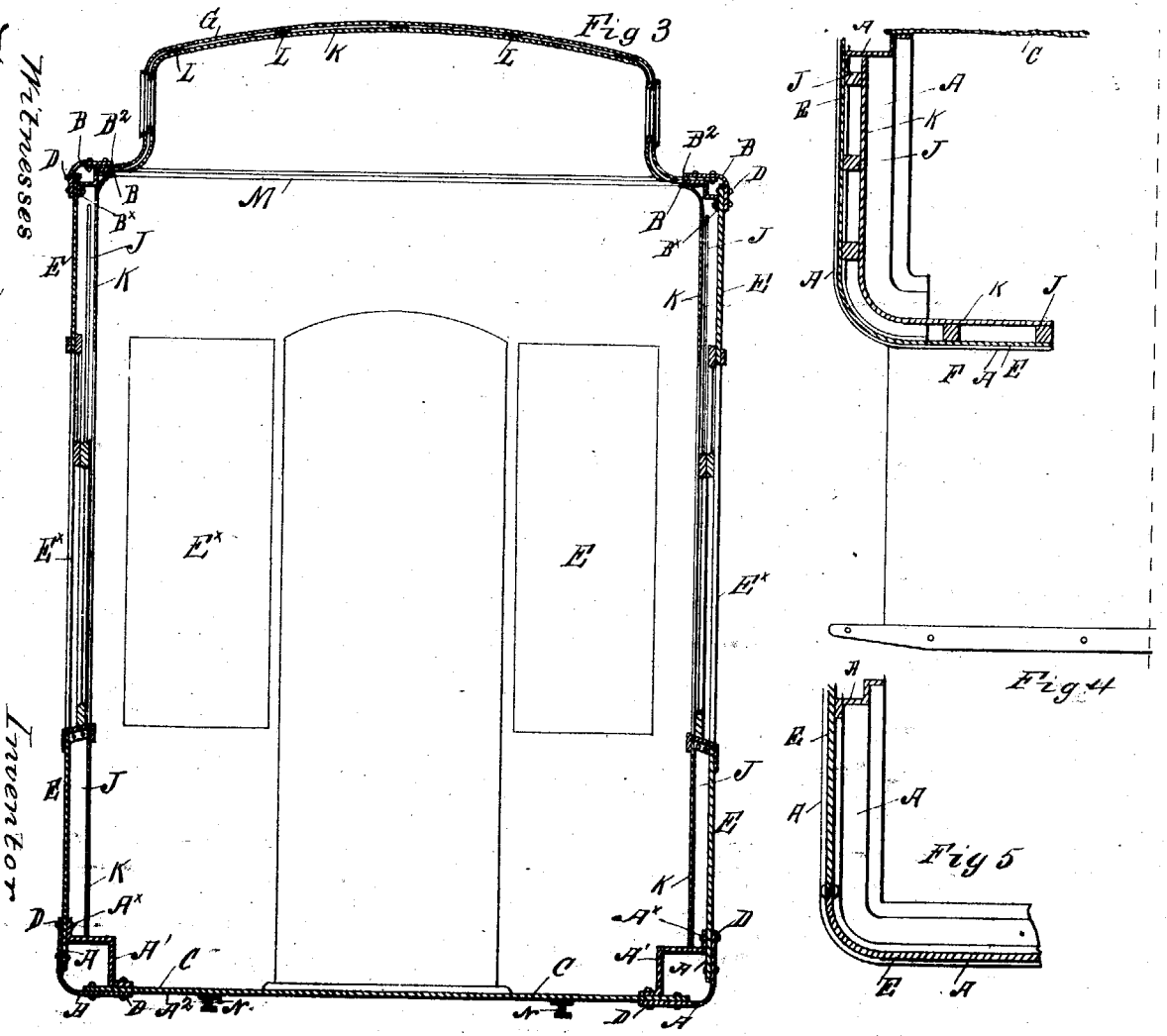
Witnesses
Walton Hurlburt
A. M. Best
Inventor
Chester W. M. Smith
By Coburn & Fisher
Attys.

UNITED STATES PATENT OFFICE.

CHESTER W. M. SMITH, OF SAN FRANCISCO, CALIFORNIA.

RAILWAY-CAR.

SPECIFICATION forming part of Reissued Letters Patent No. 11,023, dated August 13, 1889.

Original No. 359,640, dated March 22, 1887. Application for reissue filed May 29, 1889. Serial No. 312,666.

*To all whom it may concern:*

Be it known that I, CHESTER W. M. SMITH, a citizen of the United States, residing at San Francisco, in the county of San Francisco and State of California, have invented certain new and useful Improvements in Railway-Cars, of which the following is a specification.

The object of my invention is to provide a railway-car constructed of metal that will be proof against collisions and destruction by fire. I accomplish this object by the means illustrated in the accompanying drawings, in which—

Figure 1:
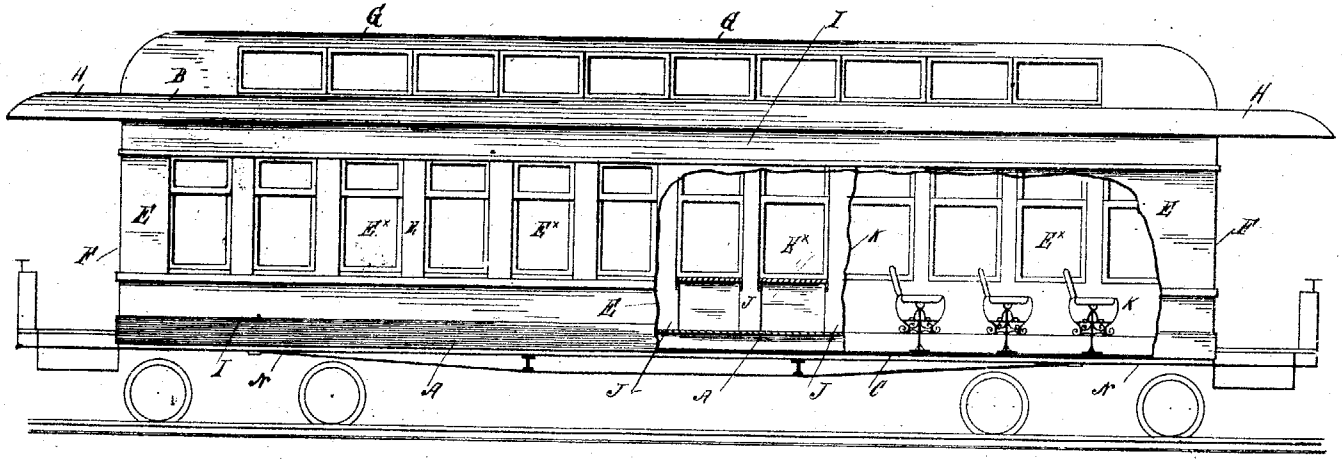
Figure 2:
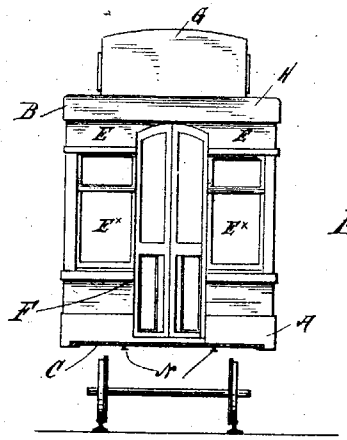

Figure 1 is a side elevation of my railway-car, with parts broken away to show construction and interior of car. Fig. 2 is an end view of the same. Fig. 3 represents parts in section through car. Fig. 4 is a horizontal section of a portion of the car, taken below the windows. In Fig. 5 a different manner of joining end plates to side plates is shown.

Similar letters refer to similar parts throughout the several views.

In constructing my safety railway-car I have found it necessary that all the parts be made of iron or other metal, and nothing be left for the devouring element of fire to consume, or splinters or broken fragments to wound or maim the passengers therein when collision takes place. Hence my safety-car is constructed as nearly as possible of iron or other metal, and the parts so disposed and arranged as to receive the shock from collision at the strongest and best fortified points to oppose such contact successfully, as well as to resist the action of fire in case of accident.

Let A A′ represent the two plates which together form the sills of the car, and one of which, as A′, is bent in the peculiar manner shown in cross-section, Fig. 3, to provide the lips or flanges $A^{\times}$ $A^{2}$, to receive the side sheets or walls and floor of the car. B B′ are the plates that form the beams or girders, which are constructed in like manner as that of the sills, and one of which, as B′, is provided with the lips or flanges $B^{\times}$ $B^{2}$, to receive the upper ends of the side sheets and the edges of the roof-plate. These beams or girders are inverted and receive the upper ends of the side sheets or walls and the roof of the car. In constructing these sills and beams or girders the outer plates are bent simply at a right angle, and the edges thereof form one-half of the two lips or flanges which receive the side sheets, while the inner plates are bent to a right angle, after which the edge of each member is bent outward to a right angle and placed parallel with the outer plate, in which position the bent edges thereof form the inner half of the two lips or flanges of the sills and beams.

The floor C of my car is constructed of one sheet of rolled iron and extends beyond the body of the car at both ends, forming the platforms. This sheet is arranged between the two lips or bent plates forming the sills, and the edges of said floor C may, if desired, be made to extend inward within the sills between their lips or flanges sufficiently far to touch the outer angle-plates at or near the point where they are bent to a right angle, as above explained. This mode of construction may be adopted where greater strength is needed. In this position the floor is bolted between the lips or flanges through and through at suitable intervals of space from end to end of the car by bolts or rivets D, as in riveting boiler-plates.

The side sheets of my railway-car are composed of a single plate of rolled metal E, suitable spaces $E^{\times}$ being cut out for windows and ventilation. The upper and lower edges of these plates extend between the lips of the sills and the beams or girders, as shown, and said side plates and the inclosing-flanges of the beams are bolted or riveted through and through at suitable intervals of space, as in bolting or fastening the floor. The lower edges of these side plates may rest upon the flooring-sheet at right angles when the latter is extended to the inner face of the sills. The ends of these side sheets, forming the side walls of the car, may be extended outward and wiped or bent around to form the ends of the car, as at F, with suitable spaces cut away to provide for the doors and end windows, in which case the outer ends of the inner angle-irons A′ of the beams are bent around and extended inward somewhat, as shown in Fig. 4 of the drawings, so that the end plates will breast against this bend and extension and will be held in position thereby at the foot and overhead; or these end pieces may be composed of separate curved plates and be bolted to the outside of side plates or walls of the cars. (Shown in Fig. 5.)

Good rolled iron one-half inch in thickness will answer for the plates composing the lower beams or girders and three-eighths or one-half inch iron for the plates composing the upper beams and floor and side plates or walls, while the roof may be composed of a thinner and lighter plate or metal.

The roof G is constructed of a single plate and sprung or bent to form the desired curvature, and the edges are clamped between the inner lips, laps, or flanges formed by the plates composing the upper beams or girders by the rivets or bolts D, bolted through and through in the same manner as in uniting the side walls or plates and the floor above described, while the ends of the roof-plate are rounded and extend over the platform, as shown. Suitable spaces are cut from the roof for windows and ventilation before it is sprung or put in position.

The gables H of the car may be composed of separate pieces cut to conform to the curve of the roof at the upper ends and bolted to the inner face of the roof and the upper end of end plates of the car when the sheets of the side plates are bent around to form the ends of the car, as hereinbefore described; but when the end plates are composed of separate sheets these may be cut out to form and carry the gables or ends with them. Suitable lettering-boards will be provided by the outer faces of the upper and outer angle-plates composing the upper beams or girders.

For supporting and strengthening the interior of the car vertical or upright wooden or iron posts J are interposed along the sides between the window-openings. The upper and lower faces of the sills may be held in position by bolts, or the ends may be mortised into the beams. By this means the body of the car will be relieved of the downward thrust or spring in practice and means be provided for hanging and operating the windows of the car. These upright posts also serve as another important and valuable factor in lining the interior of my car, which lining consists of thin sheets of metal K—such as copper, brass, or other non-combustible material—which may have a surface of some dead color to take off the glare or dazzle, and also be suitably ornamented. These sheets are tacked or secured to the upright posts with tacks, nails, or screws with ornamented heads, and the sheets may extend across the interior face of the dome of the car and be kept in position by fastening to the longitudinal flat bars L.

At suitable intervals of space along the interior of the car are connected the T-braces M, which latter may be constructed of some light material, such as galvanized or plated iron.

The body of my car rests upon the horizontal sleepers or beams N, constructed of wood or iron. To these beams are connected the trucks and brake-connections, and they will also support the extended ends of the iron floor or platforms. A packing—such as cotton duck or rubber—is employed where iron is opposed to or joined with iron, such as the joints and drill-holes for the bolts or rivets, to neutralize the jarring effect of such connections.

Having thus described the construction of the body and frame-work of my collision and fire-proof car, I will now proceed to describe the interior fittings.

The saloons, closets, and doors are constructed of light sheet metal suitably ornamented, and the partitions of the closets and saloons are connected to the body of the car by V or L angle-irons in the usual way. The seat-frames are composed of light metal upholstered with some incombustible material. The outer ends of the seat-frames are connected to and supported upon the upper faces of the lower sills, with the inner ends bolted to the iron flooring. In sleeping-cars the frames composing the berths therein will be constructed of light metal and be folded up within the casing of the car in the usual way.

The bedding will be prepared of materials made incombustible by saturation in such fire-proof chemicals as are well known in the arts, and every effort made to guard against cremation of occupants in case the upsetting of furnaces or stoves in the car should take place.

It will thus be seen that but little, if any, material will be contained in or about the car for the devouring elements of fire to feed upon.

In the construction described above it will be seen that the sills at the bottom of the car are tubular in structure and that the beams at the upper corners of the car are also of the same form, which form, as is well known, secures the greatest strength with the least amount of metal. Four tubes run the entire length of the car, two at the respective lower corners and the other two at the respective upper corners thereof. It will be seen that the floor-plate is connected directly to these two lower tubular sills and that the side plates are similarly connected to both the tubular sills and tubular beams, and the roof-plate is similarly connected to the respective tubular beams. It will also be seen that at the floor of the car the plate is of a single thickness and that the same is true of the sides and roof of the car, so that the car is made up of the four tubes running the length thereof and a single thickness of plate fastened or riveted to these tubes to form the floor, sides, and roof.

Having thus described my invention, what I claim as new, and desire to secure by Letters Patent, is—

1. The combination, in a metallic railway-car, of tubular sills arranged one at each lower corner and a single-thickness metal flooring secured to said sills, substantially as and for the purposes specified.

2. The combination, in a metallic railway-car, of tubular sills arranged at the respective lower corners thereof and single-thickness side plates secured to the said sills, substantially as and for the purposes specified.

3. The combination, in a metallic railway-car, of tubular sills arranged at the respective lower corners, tubular beams arranged at the respective upper corners, and single-thickness side plates secured at the bottom to the said sills and at the top to the said beams, substantially as and for the purposes specified.

4. The combination, in a metallic railway-car, of tubular sills at the lower corners thereof and single-thickness floor-plates and side plates secured, respectively, to the said sills, substantially as and for the purposes specified.

5. The combination, in a metallic railway-car, of the tubular sills arranged, respectively, at the lower corners, the tubular beams arranged, respectively, at the upper corners thereof, single-thickness floor-plates secured to the respective sills, single-thickness side plates secured at the bottom to the tubular sills and at the top to the tubular beams, and single-thickness roof-plate bent into proper form and secured to the respective tubular beams, substantially as and for the purposes specified.

6. The combination, in a car constructed wholly of metal, or partially of metal and partially of wood, of the sills and beams or girders composed of angle-plates bent so as to form double horizontal and vertical lips or flanges, as described.

7. The combination, in a car constructed wholly of metal, or partially of metal and partially of wood, of the iron sheet or flooring bolted between the horizontal lips or flanges of the sills, the edges of said sheet or floor extending to or nearly to the outer plates of the sills, in the manner described.

8. The combination, in a car constructed wholly of metal, or partially of metal and partially of wood, of the side walls or sheets E, bolted or riveted between the lips or flanges of the sills and the lips or flanges of the beams or girders, in the manner set forth and specified.

9. The combination, in a car constructed wholly of metal, or partially of metal and partially of wood, of the metallic roof G, bolted or riveted between the lips or flanges of the inverted beams or girders B B′, constructed and arranged substantially in the manner herein set forth and specified.

10. In a railway-car, the ends of the side sheets or walls bent around against the ends of the sills and beams or girders to form the corners and ends of the car, in the manner described, when continuous or extended sheets are employed, or the separate end sheets or plates bent so as to form the corners and front of the car-body and lapped and riveted to the said side sheets, as described.

11. The combination, in a car constructed wholly of metal, or partially of metal and partially of wood, of the upright or vertical posts resting upon and bolted to the sills and beams or girders, or with the lower ends of said posts mortised into the sills, as specified, for the purposes set forth.

12. The method herein described of forming sills, beams, or girders for railway-cars and other structures where sheets of metal are to be vertically and horizontally united by bolts or rivets, consisting of two metal plates, one of which is bent at right angles and the other plate bent to a right angle, and the edge of each member bent to a right angle and placed parallel to the outer plate, whereby the two series of vertical and horizontal lips, laps, or flanges are formed for bolting or riveting vertical and horizontal connecting-sheets, as described.

CHESTER W. M. SMITH.

Witnesses:
CARRIE FEIGEL,
A. M. BEST.